Figure 1:
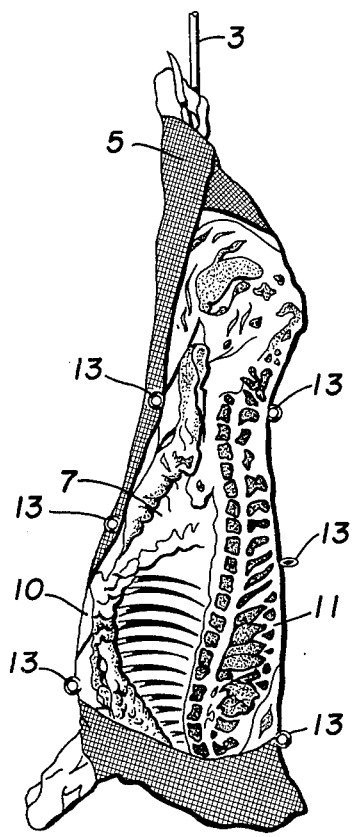

United States Patent [19]
Kocay et al.

[11] 3,881,525
[45] May 6, 1975

[54] POLYESTER MEAT SHROUD

[75] Inventors: Witold R. Kocay, Creve Coeur, Mo.;
James B. Denmark, Decatur, Ala.

[73] Assignee: Monsanto Company, St. Louis, Mo.

[22] Filed: Sept. 26, 1973

[21] Appl. No.: 400,870

[52] U.S. Cl. ............................. 139/420 R; 99/174
[51] Int. Cl. .......................................... D03d 15/00
[58] Field of Search ........ 139/383 R, 420 R, 426 R; 99/174

[56] References Cited
UNITED STATES PATENTS

| | | | |
|---|---|---|---|
| 3,275,455 | 9/1966 | Williams | 139/426 |
| 3,741,260 | 6/1973 | Kocay | 139/420 |

*Primary Examiner*—Henry S. Jaudon
*Attorney, Agent, or Firm*—Thomas Y. Awalt, Jr.

[57] ABSTRACT

Nonswelling, nonwicking, nonshedding meat shrouds of high tenacity polyethylene terephthalate filament with inherently low moisture regain provide superior conductivity while conditioning meat carcasses in the chilling stages without excessive dehydration.

11 Claims, 2 Drawing Figures

POLYESTER MEAT SHROUD

This invention relates to the conditioning of animal carcasses after slaughtering and skinning. The carcasses, with a smooth, bleached surface, are shrouded and placed in a cool atmosphere and the carcass temperature is lowered to about the freezing temperature.

Meats shrouds have been produced from cotton, ramie, rayon and polyester staple. Before the introduction of polyester staple in shrouds generally speaking, moisture regain, wicking, water swelling, water retention, and high wet-modulus were considered essential characteristics to be sought in meat shrouds in order to prevent the dehydration of the meat, and in order to absorb blood so that the surface of the meat be rendered as blood-free as possible. Standard acceptable moisture absorption percentages in commercial shrouds were (and are) of the order of 120–160 percent. It was also (and is) considered essential that meat shrouds have high strength and resistance to tear and a soil and stain release as well as stability to withstand chlorine bleaching without serious fiber damage for the reason that meat shrouds are laundered after each use and must be reasonably clean for reuse. Fibers of polyethylene terephthalate, having a generally low moisture regain, wicking action, water retention, etc. have been use in the meat shroud industry only in staple form as described in U.S. Pat. No. 3,741,260, filed June 23, 1971, because it was thought that, with a low moisture regain fiber, only a staple yarn would impart sufficient fabric moisture regain, wicking action, swelling, etc., to provide sufficient absorption of the blood from the meat carcasses. It was found, however, that although shrouds constructed of staple polyester fibers were suitable indeed for meat shrouds, there was one deficiency inherent in the staple fiber form; and that is, the shrouds have a tendency to shed or fibers, occasional parts of a fiber on the carcass, especially after having been washed many times. These individual fibers, usually of a fraction of an inch in length, while of no particular significance from a health and sanitation point of view, were a great dial more conspicuous than cellulosic fiber deposits, due to accumulation of electrostatic charge on these fibrils and appear somewhat more like animal hair which is considered as a source of possible contamination originating from animal skin.

It is an object of this invention to provide a meat shroud which does not leave a hair-like deposit on the carcass, but will function to prevent excessive dehydration of the meat carcass, all the while providing sufficient absorption of blood and smoothening of carcass surface.

It is another object of this invention to provide a meat shroud having extremely high breaking strength, grab strength, tear strength, and skewer strength.

It is yet another object of this invention to provide a method for the preparation of meat shrouds from polyester fibers which are not only the functional equivalents of other meats shrouds, but are superior by having the low moisture regain and absorption characteristics and thus do not act as moisture carrier or a conduit from the carcass body to the outside, with consequent ease of soil and stain release in conjunction with the exceptionally high breaking strength normally expected in polyester continuous filaments and fabrics.

These and other objects of the invention will become apparent from a consideration of the following specification and claims.

Figure 2:
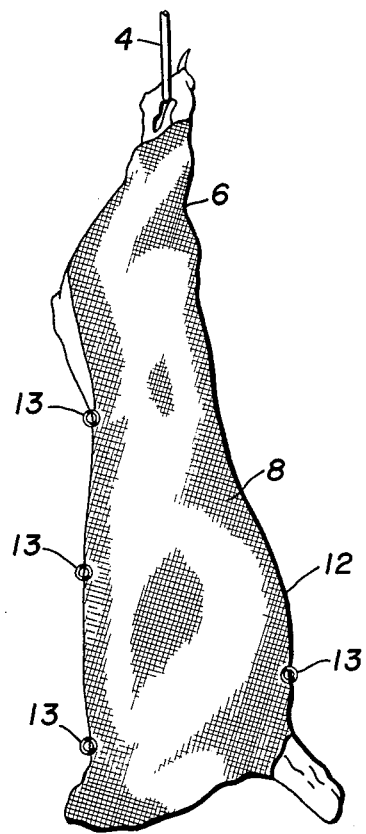

Reference may be made to the drawing in which FIGS. 1 and 2 are general perspective views of sides of beef clothed with shrouds.

In accordance with this invention, meat shrouds are produced, a substantial portion of which comprise a manufactured fiber in which the fiber-forming substance is a long-chain synthetic polymer composed of at least 85% by weight of an ester of a dihydric alcohol and terephthalic acid, the fibers being characterized by a denier of from about 4 to 8; a tenacity of at least about 4 grams per denier, a very low (about 0.4) moisture regain; the yarn being of continuous filament; the fabric being characterized by a skewer strength of at least about 80 lbs, a grab strength of at least about 200 lbs in both warp and fill direction, low shrinkage, and high abrasion, a 15% simulated carcass relative moisture retention capability when tested on wet carborundum stone for 24 hours, and a fabric moisture absorption of no more than about 65%.

I have discovered that polyester meat shroud cloths made in accordance with these specifications can be more effective than presently used 100% ramie, cotton, or other cellulosic cloth, in preventing the dehydration of whole beef carcasses.

In FIGS. 1 and 2, two sides of beef are shown suspended from conventional hooks 3 and 4. The shrouds 5 and 6 are shown wrapped snugly and smoothly about the skinned surfaces of the carcass, however no strings or ties are used at either hindshanks or foreshanks, the extremities of which are not covered. The shrouds are also secured to the edges 10, 11 and 12 of the visceral cavities 7 and 8 as by skewers 13.

The terms used above are employed in the usual meaning in the textile art except as follows. "Skewer strength" is a laboratory test designed to measure the pounds of force required to rupture the fabric when strained by a skewer of similar design to that actually used in a packing plant during the shrouding operation. After wetting, a specimen from the fabric is punctured by the skewer near one end and the opposite end is clamped in the stressing jaw of a tensile tester at a constant rate of extension. The cross-wise yarns are pulled against the skewer until a number have ruptured. The force is recorded automatically on a chart calibrated in units of pounds. The average of the individual yarn breaks for each principle direction is reported for the sample. The value obtained is a function of the individual yarn strength plus the support of the adjacent yarns. Calculation of the average force is based on ASTM Standard D-2261 "Tearing Strength of Fabrics by Tongue Method (Constant Rate-of-Extension Tensile Testing Machine)." The average of the five highest peaks recorded on the chart is reported. Specimens having filling yarns parallel to the long dimension are used for testing the warp yarns, and specimens with the warp yarns parallel to the long dimension are used for the test of the filling yarns. All specimens are soaked in distilled water for two hours, removed and blotted lightly to remove surface water. The skewer position is determined by means of a 3 inch square template drilled with a one-eighth inch hole in the center. Using the template, the skewer is positioned 1½ inches from the end of the sample. Before inserting the skewer, a pencil or similar instrument is used to spread the yarns in the form of a hole. The skewer projection is fastened to the upper grip of the tensile tester and the other end of the sample is clamped in the lower grip. The tensile tester is operated with cross-head speed (rate of extension) of 5 inches/minute, a chart speed (recorder) of 10 inches/minute, a load scale of 200 pounds, a jaw separation (between clamps) of 6 inches, and with jaw faces (smooth) at 1 by 3 inches.

The grap strength test or grab test is a standard method of test for textile fabrics and is known as ASTM D-1682-64 (Reapproved 1970) of the American National Standards Institute.

The polyester fibers contemplated in the practice of the invention are those formed from dicarboxylic acids and polymethylene glycols, and copolyesters or modifications of these polyesters and copolyesters. Preferred are fibers composed of at least 85% by weight of an ester of a dihydric alcohol and terephthalic acid. It is well known that these synthetic linear condensation polyesters can be formed into filaments and the like and subsequently oriented permanently by drawing. Among the polyesters and copolyesters specifically useful in the instant invention are those resulting from heating one or more of the glycols of the series $HO(CH_2)_nOH$, in which $n$ is an integer of from 2 to 10, with one or more dicarboxylic acids or ester-forming derivatives thereof. Among the dicarboxylic acids and ester-forming derivatives thereof useful in the present invention there may be named terephthalic acid, isophthalic acid, p,p'-dicarboxy-biphenyl, p,p'-dicarboxy-diphenyl sufone, p,p'-dicarboxy-diphenyl methane, and the aliphatic, cycloaliphatic, and aryl esters, and half esters, ammonium and amine salts, and the acid halides of the above compounds, and the like. Examples of polyhydric alcohols which may be employed in the manufacture of these fibers are ethylene glycol, trimethylene glycol, cyclohexane dimethanol, and the like. Polyethylene terephthalate is the preferred polymer because of the ready availability of terephthalic acid or dimethyl terephthalate and ethylene glycol, from which it is made. It also has a relatively high melting point of 250°–265°C., and the fibers are, in themselves more readily wettable as compared, for example, with nylon or polypropylene.

As used herein the words "major portion" must be construed very broadly simply because fabrics can be constructed of any percentage of various component fibers or filament. The examples will show meat shrouds constructed of 100% flat yarn filament, and of flat and textured polyester filament. Of course, combinations of polyester filament and polyester staple as well as polyester filament and other cellulosic and non cellulosic components including nylon staple or filament, and cotton are also contemplated within the purview of this invention. Eighty-five percent or more of the continuous filament polyester described in this invention would be considered a "major portion."

Except as otherwise specified polyethylene terephthalate filament of 5.2 denier, a tenacity of 8 grams per denier, and having an elongation of 20%, was used in the construction of meat shrouds in the following examples.

EXAMPLE 1

A meat shroud was constructed according to the following specifications:

TABLE I

| Warp Preparation and Weaving Data | |
|---|---|
| Warp: | Polyester |
| Yarn | 100% 1000-192-3Z Continuous Filament polyester |
| Width in Reed | 48.4 |
| Total Ends | 1464 (1434 + 30 selv.) |
| Reed | 15/2 |
| Draw | Straight |
| Harness | 4 + 2 selvage |
| Yards Beamed | 250 |
| Size | Not sized |
| Filling: | |
| Yarn | 100% 1000-192-1/3Z Continuous Filament polyester |
| Pick Gear | 26 |
| Weave | Plain |
| Loom Draper X-3 | |
| Greige Fabric: | |
| Greige Width | 47.3 |
| Construction | 31 ends per inch; 26 picks per inch |
| ox/yd² | 7.7 |
| ox/lin yd | 10.1 |

The meat shroud fabric was found to possess the following strength and shrinkage characteristics:

TABLE 2

| | |
|---|---|
| Grab strength, lbs. | |
| Warp | 738 |
| Filling | 628 |
| Tear Strength, lbs. | |
| Warp | 51 |
| Filling | 49 |
| Skewer strength, lbs. | |
| Warp | 199 |
| Filling | 216 |
| Shrinkage, % | |
| After 1 wash, 180°F (drip dry) | |
| Length | 1.7 |
| Width | 0.7 |
| After 2 washings, 180°F (drip dry) | |
| Length | 1.9 |
| Width | 0.9 |
| After 5 washings, 180°F (drip dry) | |
| Length | 2.3 |
| Width | 1.1 |

In order to determine the simulated carcass relative moisture retention capability of the shrouds, five specimens of previously washed (at 140°F) fabric were cut into pieces 6¾ inches by 8 inches. Sixty milliliters of distilled water was absorbed into each of five carborundum stones 6 inches by 2 inches by 1 inch. The fabric specimens were wrapped around each of the stones containing the 60 milliliters of water and secured by straight pins. One stone was left unwrapped for use as a control. The stones were hung by a string and weighed; then they were hung in a conditioning chamber at 70°F and 50% relative humidity for 16 hours. Stones with wrapping were removed and weighed, and moisture loss calculated on the basis of the difference in weight was as follows:

TABLE 3

| | |
|---|---|
| Moisture Loss, gms. | |
| from unwrapped stone | 30.4 |
| from wrapped stone | |
| Specimen No. 1 | 22.4 |
| Specimen No. 2 | 23.0 |
| Specimen No. 3 | 23.9 |
| Specimen No. 4 | 27.4 |
| Specimen No. 5 | 23.3 |
| Average | 24.0 |

EXAMPLES 2–3

Meat shrouds of polyester filament non-textured warp and textured fill were constructed denier tested as follows:

Example 2: 1,000 denier warp/2 × 150 denisr textured polyester filling, 28 picks.

Example 3: 1,000 denier warp/4 × 150 denier textured polyester filling, 28 picks.

TABLE 4

|  | Ex. 2 | Ex. 3 |  |
|---|---|---|---|
| Width, inches | 44.1 | 45.3 |  |
| Ends/Inch | 34 | 34 |  |
| Picks/Inch | 27 | 28 |  |
| Weight, oz/sq yd | 6.16 | 7.23 |  |
| oz/running yd | 7.55 | 9.10 |  |
| Grab Test |  |  |  |
| Warp |  |  |  |
|   Breaking Strength, lbs | 553.5 | 579.0 |  |
|   Elongation, % | 17 | 22 |  |
| Filling |  |  |  |
|   Breaking Strength, lbs | 126.2 | 262.3 |  |
|   Elongation, % | 55 | 56 |  |
| Skewer Test |  |  |  |
|   Warp Strength, lbs | 82.9* | 143.6* |  |
|   Filling Strength, lbs | 43.6* | 71.3* |  |
| Porous Block Moisture Loss, gms[1] |  |  | Unwrapped stone |
| 70°F 50% RH |  |  |  |
|   16 hours | 26.3 | 26.5 | 31.0 |
|   20 hours | 31.5 | 31.5 | 36.5 |
|   24 hours | 36.3 | 36.2 | 41.2 |

*Yarns did not break, they pulled out of fabric.
[1] Porous blocks containing 60 mls of distilled water were wrapped with dry shroud fabric which had been laundered 1 time.

EXAMPLE 4

A 28 × 24 inch piece of shroud fabric constructed of 100% polyester 1,000 denier continuous filament was heat set 60 seconds at 400°F.

TABLE 5

| Test Data: |  |
|---|---|
| Weight, oz/yd² | 7.9 |
| Ends/Inch | 30 |
| Picks/Inch | 25 |
| Grab Strength, lbs |  |
|   Warp Direction | 641 |
|   Filling Direction | 552 |
| Grab Elongation, % |  |
|   Warp Direction | 25 |
|   Filling Direction | 25 |
| Skewer Strength, lbs |  |
|   Warp | 222 |
|   Filling | 167 |
| Moisture Loss, gms |  |
| Unwrapped Stone |  |
|   After 16 hours | 30.8 |
|   After 20 hours | 36.8 |
|   After 24 hours | 41.9 |
| Wrapped Stone |  |
|   After 16 hours | 26.7 |
|   After 20 hours | 30.8 |
|   After 24 hours | 35.2 |

In all of the above described examples, the moisture absorbency of the shroud fabrics was inherently low (of the order of about 48 percent). High filament content fabric blends having a small percentage of high moisture regain component would be expected to run somewhat higher than this. For example, a fabric blend containing 85 percent polyester filament and 15 percent cotton might be expected to have a moisture absorbency of about 70 percent. By "moisture absorption" or "moisture absorbency" is meant the amount of moisture in terms of weight percent (based on the weight of the fabric) which remains on a 22 cm × 22 cm fabric sample after soaking in distilled water at room temperature for 15 minutes, followed by removal from the water and dripping from one corner of the sample for 30 seconds.

EXAMPLE 5

A cotton fabric control meat shroud was constructed and tested as follows:

TABLE 6

| | |
|---|---|
| Greige Width | 40" |
| Ends × Picks, center of fabric | 36 × 31 |
| Ends × Picks, within 4" of selvage | 71 × 31 |
| Boiling water shrink | 13% × 8% |
| Grab Strength, center portion laundered fabric | 73 × 108 lb. |
| Tear strength, center portion laundered fabric | 9.2 × 6.9 lb. |
| Skewer strength, center portion laundered fabric | 19 × 24 lb. |
| Skewer strength, near selvage | 34 × 23 lb. |

| Moisture Loss, grams | Polyester Staple | Unwrapped | Cotton |
|---|---|---|---|
| 16 hours | 37.3 | 38.2 | 47.6 |
| 18 hours | 40.5 | 42.2 | 52.4 |
| 20 hours | 43.8 | 46.1 | 56.3 |
| 22 hours | 46.5 | 49.3 | 59.4 |

Commercial cotton shrouds have moisture absorbencies of the order of about 153 percent.

We claim:

1. Meat shrouds consisting essentially of a fabric, a major portion of which comprises a continuous filament yarn, a major portion of which comprises a manufactured filament in which the filament-forming substance is a long-chain synthetic polymer composed of at least 85% by weight of an ester of a dihydric alcohol and a dicarboxylic acid, said fibers being characterized by:
   a. A denier from about 4 to 8;
   b. A tenacity of at least about 4 gpd
   said fabric being characterized by:
   a. A simulated carcass relative moisture retention capability of at least 15%;
   b. A skewer strength of at least about 80 lbs.;
   c. A grab strength of at least about 200 lbs. in both warp and fill direction;

d. A fabric moisture absorption of no more than about 70%.

2. The meat shroud of claim 1 wherein the skewer strength is at least about 150 lbs. in the warp direction.

3. The meat shroud of claim 1 wherein the skewer strength is at least about 150 lbs. in the fill direction.

4. The meat shroud of claim 1 wherein the grab strength is at least 250 lbs. in the warp direction.

5. The meat shroud of claim 1 wherein the grab strength is at least 250 lbs. in the fill direction.

6. The meat shroud of claim 1 wherein the skewer strength is at least about 199 lbs. in the warp direction.

7. The meat shroud of claim 1 wherein the skewer strength is at least about 216 lbs. in the fill direction.

8. The meat shroud of claim 1 wherein the grab strength is at least 738 lbs. in the warp direction.

9. The meat shroud of claim 1 wherein the grab strength is at least 600 lbs. in the fill direction.

10. The meat shroud of claim 1 wherein the simulated carcass relative moisture retention is at least 20%, and the moisture absorbency is no more than about 60%.

11. Meat shroud fabrics, a major portion of which comprises continuous filament yarn, a major portion of which comprises a manufactured filament in which the filament-forming substance is a long-chain synthetic polymer composed of at least 85% by weight of an ester of a dihydric alcohol and a dicarboxylic acid, said fibers being characterized by:
   a. A denier/filament of about 4–8;
   b. A tenacity of at least about 6 gpd
said fabric being characterized by:
   a. A simulated carcass relative moisture retention capability of at least about 20%;
   b. a skewer strength of at least about 100 lbs.;
   c. A grab strength of at least about 300 lbs. in both warp and fill direction;
   d. A fabric moisture absorption of no more than about 70%.

* * * * *

UNITED STATES PATENT OFFICE
CERTIFICATE OF CORRECTION

PATENT NO. : 3,881,525
DATED : May 6, 1975
INVENTOR(S) : Witold R. Kocay and James B. Denmark It is certified that error appears in the above-identified patent and that said Letters Patent are hereby corrected as shown below:

Col. 1, line 8, "Meats" should read ---Meat---.

Col. 1, line 28, "use" should read ---used---.

Col. 1, line 39, should read ---shrouds have a tendency to shed or deposit occasional---.

Col. 1, line 61, "meats" should read ---meat---.

Col. 5, line 3, should read ---warp and textured fill were constructed and tested as ---.

Col. 5, line 5, "denisr" should read ---denier---.

Signed and Sealed this twenty-sixth Day of August 1975

[SEAL]

Attest:

RUTH C. MASON
Attesting Officer

C. MARSHALL DANN
Commissioner of Patents and Trademarks